| United States Patent [19] | [11] Patent Number: 4,834,995 |
| Canzoneri | [45] Date of Patent: May 30, 1989 |

[54] METHOD FOR PREPARING PIZZA DOUGH

[76] Inventor: Salavatore Canzoneri, 2436 Tennyson La., Highland Park, Ill. 60035

[21] Appl. No.: 60,731

[22] Filed: Jun. 10, 1987

[51] Int. Cl.⁴ .............................................. A23P 1/08
[52] U.S. Cl. .................................... 426/296; 426/94; 426/289; 426/293; 426/653
[58] Field of Search ............... 426/289, 293, 302, 549, 426/653, 94, 296

[56] References Cited

U.S. PATENT DOCUMENTS

| 4,068,009 | 1/1978 | Rispoli et al. | 426/293 |
| 4,199,603 | 4/1980 | Sortwell | 426/289 |
| 4,518,620 | 5/1985 | Monagle et al. | 426/289 |
| 4,609,555 | 9/1986 | Becher et al. | 426/653 |
| 4,640,837 | 2/1987 | Coleman et al. | 426/302 |

Primary Examiner—Marianne Cintins
Assistant Examiner—Mary S. Mims
Attorney, Agent, or Firm—Charles W. Rummler

[57] ABSTRACT

A method for making pizzas having a substantially permanent crispness wherein a particular bread crumb material is used to modify the pizza dough so as to accomplish that result, the said crumb material comprising Japanese-style bread crumbs milled to provide a quantity of particle sizes at least small enough to pass through the screen of a U.S. Standard #20 sieve, and the pizza dough being modified by having the said crumb particles included in the dough mass forming the pizza crust.

2 Claims, No Drawings

METHOD FOR PREPARING PIZZA DOUGH

FIELD OF THE INVENTION

This invention relates generally to methods for treating pizza baking dough and, more specifically, to a particular method for preparing and baking pizza dough. Use of my invention results in a crust which is crisp when initially baked, retains its crispness even when subsequently cooled or refrigerated and later reheated for use, and helps prevent scorching of the crust during cooking of the pizza topping.

BACKGROUND OF THE INVENTION

A large and growing industry has developed around the preparation and serving of pizza as a food item. Preparation of a pizza typically requires forming a flattened crust made of dough containing major proportions of flour and water, kneaded, and rolled to shape. The crust forms the base to hold the cheese, sauce and other pizza toppings.

After the toppings are in place, the pizza is placed in an oven and baked until the dough is cooked thoroughly enough to form a firm crust while the toppings are cooked as well and the process must be timed to allow both crust and toppings to be fully cooked without burning one or the other. Some varieties of pizza are baked in shallow pans or trays, and the preparation of such pizzas often requires the use of oils, fats or other lubricants to prevent the crust from sticking once cooked. Use of such lubricants is undesirable because they are costly and require significant cleanup efforts.

During the baking process, pizzas must be monitored to make sure that the crust does not overcook or burn. This is often difficult to do when a commercial oven contains numerous pizzas cooking simultaneously.

One major concern of pizza makers is achieving and thereafter maintaining crispness in the dough crust. Although pizza is generally served as a restaurant food itme, pizzas are also very often taken home or delivered to the home for comsumption. Leftover pizza is often refrigerated and reheated to be eaten later. I have found that the cooling and/or subsequent reheating of conventionally made pizza causes the crust to lose whatever initial crispness it may have had. I have also found that the baking tecnhiques required to produce a crust of considerable crispness may also dictate that the pizza be left in the oven longer than is provident, accentuating the risk of burning or overcooking the crust or the toppings. I have also found that the use of oils or fats contributes to the sogginess of crusts baked in trays or pans.

Accordingly, the need exists for a material and method of preparing pizza dough which will cook up into a crisp pizza crust and which will maintain its original crispness through subsequent cooling and reheating.

I am aware that others have utilized certain food additives in processes intended to modify the characteristics of products made from baking dough. Most are intended to prevent or limit the tendency of raw dough to stick to mixing implements and the baking or cooking surfaces.

U.S. Pat. No. 4,407,839 (Corbeil et al.) teaches and described the uses of dusting powders in general and, in particular, the use of salt in a dusting composition as an inhibitor to insect growth. U.S. Pat. No. 1,499,080 (Short et al.) teaches a dusting power comprising corn flour mixed with wheat flour. U.S. Pat. No. 2,949,365 (Becker et al.) teaches the blending of edible fat and flour for use as an anti-stick baking compound.

In U.S. Pat. No. 3,171,747 (Kessinger), the use of a starch-and-edible-oil mixture intended for use as a dusting powder is taught. U.S. Pat. No. 3,317,323 (Lawrence) teaches a dusting compound used to allow the separation of segments of refrigerated biscuit dough. The compound includes edible oxidizing agent and rice flour. U.S. Pat. No. 3,177,081 (Kleinschmidt et al.) teaches the use of tricalcium phosphate and white corn flour in a process for producing packaged refrigerated dough products.

U.S. Pat. No. 2,012,506 (Griffith) teaches an edible dusting powder for doughnuts consisting of a grease-absorbing powder synthesized from starch grains, a sweetening agent and a grease impregnated into the grease-absorbant powder. U.S. Pat. No. 2,144,371 (Griffith) is a variation of the foregoing dusting powder, teaching the use of a blend of edible fats to produce a dusting powder suitable for packaged doughnuts.

U.S. Pat. No. 2,614,945 (Krisan) teaches and describes a dusting powder manufactured from starch treated to limit the hygroscopic tendencies of the starch. U.S. Pat. No. 1,483,704 (Wilcox) teaches the application of fat in a finely-granulated form to baking dough for baking loaves of bread.

U.S. Pat. No. 3,377,171 (Ryan et al.) teaches a dusting mixture made from starches to which vegetable oil, tricalcium phosphate and other oils and fats are added to modify the flow characteristics of the starch. U.S. Pat. No. 2,739,896 (Block et al.) teaches a doughnut dusting composition utilizing blends of hydrated and anhydrous dextrose to achieve the desired flow characteristics for the dusting powder. U.S. Pat. No. 2,793,123 (Haas) teaches a dusting powder for mass baking operations to produce bakery products such as bread loaves.

There are also known in the art various coating compositions used to create batter-like a crisp outer coating for cooked food. Exemplary of these are U.S. Pat. Nos. 4,640,837 (Coleman et al.); 4,199,603 (Sortwell III); 4,496,601 (Rispoli et al.); and 4,518,618 (Hsia et al.), all of which teach various coating mixtures used to impart a crisp texture to non-fried food, i.e., food cooked in a microwave oven or a conventional oven.

Also of interest is U.S. Pat. No. 4,518,620 (Monagle et al.) which teaches and describes the use of product known as Japanese-style bread crumbs to produce a breading batter for foods. Monagle et al. teach the use of such a batter for microwave cooking to produce a finished product with a crisp, crunchy coating otherwise obtainable only by frying or through the use of microwave baking accessories such as browning skillets or crispers. Use of the Japanese-style bread crumbs described by Monagle et al. is the subject of U.S. Pat. No. 4,068,009 (Rispoli et al.), assigned to General Foods Corporation. The bread crumbs in question consist essentially of wheat flour, yeast, and salt, and have an elongated porous and striated structure. Use of such bread crumbs in preparing food coatings is also described in the aforementioned U.S. Pat. No. 4,496,601 (Rispoli et al.), along with other coating formulations (See Rispoli et al., Column 1, Lines 24 through 31). Each of the before mentioned patents is directed to a dusting or coating material applied to the outer surface of the article to be cooked and in no case is the material integrated with or used as a componet of the baking dough itself.

BRIEF DESCRIPTION OF THE INVENTION

I have found that the Japanese-style bread crumbs described in the '009 Rispoli patent may be modified for use in non-batter form as a treatment for pizza dough and that the use of this treatment yields unexpected and surprising results in producing a pizza crust which is crisp, resists burning and sticking during normal commercial baking operations, and which will, when cooled and then reheated, regain its original crispness.

DETAILED DESCRIPTION OF THE INVENTION

The present invention consists principally of a particular product for applicant's purpose resulting from the milling of Japanese-style bread crumbs and the use of a selected portion the resulting material in methods for the preparation of dough for baking pizza.

Japanese-style bread crumbs are purchased directly from Newly Weds Foods, Inc., Chicago, Ill. In a preferred embodiment of the present invention, the original Japanese-style bread crumbs are modified in accordance with the following procedures.

A charge of raw, Japanese-style bread crumbs is milled to produce a mix with selectable proportions of various granulations, with the granulations meeting selected U.S.S. sieve specifications as determined through use of a Ro-Tap testing sieve shaker manufactured by W. S. Tyler Corporation. Such granulations are prepared by grinding an initial relatively coarse charge of conventional Japanese-style bread crumbs to provide assorted particles within various specified ranges. For example, the resulting material will comprise crumb particles in varying size ranges, as shown in the following table, the percentages being the approximate amount retained on the respective sieves.

TABLE 1

|  |  | Amount Retained |
|---|---|---|
|  | U.S.S. Sieve #8: | 2%–8% |
|  | U.S.S. Sieve #14: | 28%–42% |
|  | U.S.S. Sieve #20: | 28%–42% |
| Amount smaller than | U.S.S. Sieve #20: | 18%–32% |

It is the milled material of a size passing through a #20 sieve that is sought by applicant for his invention of a process for providing long lasting crispness in baked pizzas. Preferably, millings of a smaller size are most desired, and to obtain the maximum amounts from the milling procedures, the material of Table 1 is remilled with a result such as in shown by Table 2.

This material is prepared by milling an initial quantity of Japanese-style bread crumbs to produce particles in various sizes, in the proportions and size ranges set forth above. The composition is analyzed by passing a portion of the charge successively through filter screens of increasingly fine mesh. For Example 1, the initial charge is passed through a U.S.S. #8 screen, with about 2% to about 8%, by weight of the original charge retained thereon. The remainder of the charge is then passed through a U.S.S. #14 screen, with about 28% to about 42% of the initial charge retained thereon. The remaining charge is then passed through a U.S.S. #20 screen, with about 28% to about 42% of the initial charge retained thereon, and about 18% to about 32% of the initial charge passing therethrough.

TABLE 2

|  |  | Amount Retained |
|---|---|---|
|  | U.S.S. Sieve #8: | 1%–3% |
|  | U.S.S. Sieve #14: | 16%–28% |
|  | U.S.S. Sieve #20: | 20%–32% |
| Amount smaller than | U.S.S. Sieve #20: | 44%–56% |

The charge of Table 2 is prepared and tested in the same fashion as that of Table 1. Standard U.S.S. sieve sizes are 2.38 mm. or 0.0937 in. for #8; 1.41 mm. or 0.0555 in. for #14; and 0.841 mm. or 0.0331 in. for #20.

The resulting material passing through the #20 sieve is utilized in the production of pizza in accordance with the following preferred procedures. Where pizza crusts are formed from individual dough balls, the dough ball is worked either by hand or through the use of a roller-type dough mill into the circular shape required for a pizza crust. Prior to the final shaping of the dough ball to form the flat circular pizza base, finely milled bread crumb material is sprinkled onto the dough ball and onto the work surface, and the crumb granules are worked and pressed into the dough to become an integral part thereof. Use of this material also helps prevent the dough from sticking to the dough mill rollers used to shape the dough balls into flat pizza crusts, reducing the need for dusting the dough with corn meal or flour and eliminating the mess that such dusting creates. When the dough has been formed into the final pizza base shape, granules of the above-identified formulation will have been so pressed into the dough as to be the same as a component of the dough mix.

An unexpected beneficial result arising from the use of the present product is that pizza crusts prepared in the above-identified manner may be baked for a longer time without scorching, burning or sticking. I have confirmed this by having pizza prepared in connection with the foregoing steps, placing the pizza in a pizza oven and baking the pizza until the topping begins to burn or discolor. Pizzas prepared in this manner, when removed from the oven, exhibit little or no burning on the underside of the crust. Pizzas prepared in this manner may be monitored by viewing the toppings rather than the underside of the crust, for it is the crust which generally burns or scorches prior to the toppings.

Where "deep dish" pizzas are prepared in baking pans or trays with upstanding side walls, the present when used instead of oils, greases or the like will lubricate the pan and prevent the pizza from sticking. Prior to putting the dough into the pan, about 1 to 2 ounces of the material for this invention, depending upon the size of the pizza, is sprinkled across the bottom of the pan and the crust dough is then firmly pressed into the pan to embody the material as a part of the dough body.

While it is not fully understood how these results are obtained, it is believed that the Japanese-style bread crumbs used to make the finely divided crumb material for this invention will act as heat absorbers and actually burst during the baking process to produce pores in the dough. This allows heat and air to permeate the crust rather than to concentrate along the crust at any given point sufficiently to cause the crust to burn or overcook, while creating a very crisp texture to the pizza crust dough.

Another unexpected and beneficial result arising from the use of the foregoing bread crumb material is the fact that when pizza prepared in accordance with the foregoing method is allowed to cool and is then reheated, the crust regains its initial crispness. My experience in preparing pizzas in the more conventional methods presently in use is that once pizza has been allowed to cool and is thereafter reheated, the pizza crust does not become crisp.

Another unexpected and beneficial result is that the pizza crust, when first prepared, retains its crispness even as the pizza begins to cool. This characteristics of pizza prepared in this manner becomes more important when one considers that pizzas are often prepared and delivered to a customer's house, resulting in a certain amount of cooling between the time the pizza is removed from the oven and the time it is delivered. It is an advantage to have such pizzas arrive as crisp as if the customer had gone to the restaurant and consumed the pizza as it is served from the oven. Pizza, made according to my invention, that has been allowed to cool may, upon delivery, be reheated and the crust will still have its original crispness.

Use of the present invention may also be modified by the characteristics of the flour used. For example, I have found that for dough made with high-protein flours, best results are attained when the dough is cooked within 30 to 60 minutes of the use of my invention. For doughs made with low-protein flours, several hours can elapse and good results may still be attained.

The material for my invention may be incorporated as an ingredient during the manufacture of fresh pizza dough and the resulting dough mixture may therefore be formed into dough balls or pizza crusts. I have found that fresh dough balls prepared in this manner may be frozen and thereafter thawed and used with the same results as if the dough ball had been used when fresh. I have also found that the quality of other baked items can be enhanced by use of my invention to prevent burning and enhance the crispness of the resulting product. For example, I have prepared apple pies using the present invention for the crust dough, and found the texture of the cooked crust to be improved.

While the foregoing has presented certain specific embodiments of the present invention, it is to be understood that these embodiments have been presented by way of example only. It is expected that others skilled in the art will perceive differences which, while varying from the foregoing, do not depart from the spirit and scope of the invention as herein specified and claimed.

I claim:

1. A method for crisping pizza dough during cooking, said method comprising the steps of
   (a) preparing a quantity of granulated bread crumbs having an elongated, porous and striated shape and structure, consisting essentially of wheat flour, yeast and salt, ground to provide crumb particle sizes that will pass through a U.S.S. #20 sieve;
   (b) applying said crumb particles to said dough so as to become integral therewith;
   (c) forming said dough to provide a pizza crust; and then
   (d) baking said crust.

2. A method for crisping the dough of a performed pizza crust, said method comprising the steps of:
   (a) preparing a quantity of granulated bread crumbs having an elongated, porous and striated shape and structure, consisting essentially of wheat flour, yeast and salt, said quantity of crumbs including selectable portions ground to crumb particle sizes that will pass through a U.S.S. #20 sieve;
   (b) applying said particles to said pizza crust under a sufficient pressure to embed the particles into the crust; and then
   (c) baking said pizza crust.

* * * * *